US007285953B2

(12) United States Patent
Artinger et al.

(10) Patent No.: US 7,285,953 B2
(45) Date of Patent: Oct. 23, 2007

(54) DEVICE FOR DETECTING INTERFERING PIECES IN MATERIAL TO BE CONVEYED

(75) Inventors: Manfred Artinger, Schönberg (DE); Karlheinz Dürrmeier, Spiegelau (DE)

(73) Assignee: Firma Mesutronic Geratebau GmbH, Kirchberg i., Wald (DE)

( * ) Notice: Subject to any disclaimer, the term of this patent is extended or adjusted under 35 U.S.C. 154(b) by 767 days.

(21) Appl. No.: 10/633,227

(22) Filed: Aug. 1, 2003

(65) Prior Publication Data

US 2004/0095136 A1    May 20, 2004

(30) Foreign Application Priority Data

Aug. 1, 2002  (DE)  ................. 102 35 211
May 26, 2003 (DE)  ................. 103 23 867

(51) Int. Cl.
  *G01V 3/10*   (2006.01)
  *G01N 27/72*  (2006.01)
(52) U.S. Cl. .................... 324/233; 324/326
(58) Field of Classification Search ............ 324/233, 324/326
  See application file for complete search history.

(56) References Cited

U.S. PATENT DOCUMENTS 4,700,139 A * 10/1987 Podhrasky ............. 324/329
5,426,362 A * 6/1995 Ninnis ..................... 324/235
5,929,634 A * 7/1999 Artinger .................. 324/233

FOREIGN PATENT DOCUMENTS

DE  43 42 826   6/1995
DE  195 21 266  2/1997

OTHER PUBLICATIONS

Klaus Beuth, "Digitaltechnick," *Elektronik 4*, 10 th Ed., published by Vogel Buchverlag, pp. 51.
E. Hölzler and H. Holzwarth, "Theorie und Technik der Pulsmodulation," Springer-Verlag, 1957, pp. 194-197.

* cited by examiner

*Primary Examiner*—Reena Aurora
(74) *Attorney, Agent, or Firm*—Kenyon & Kenyon LLP

(57) ABSTRACT

A device for producing a detection signal when interfering, preferably metallic conductive pieces occur in an at least largely non-conductive conveyor stream. An alternating electromagnetic field is built up by an alternating current generator through a transmission coil in a segment of the conveyor stream to be monitored. The changes in amplitude and phase of the alternating electromagnetic field are detected by a coil system that feeds an evaluating circuit for deriving the detection signal, which, when an interfering piece appears, causes a stoppage of the conveyor stream for the purpose of removing the interfering piece. A resetting device (reset button) is also provided which is able to cancel the conveyor stoppage. A device is also provided for blocking the resetting device, controlled by the evaluating circuit, which disables the resetting device as long as the evaluating circuit still emits a detection signal.

11 Claims, 3 Drawing Sheets

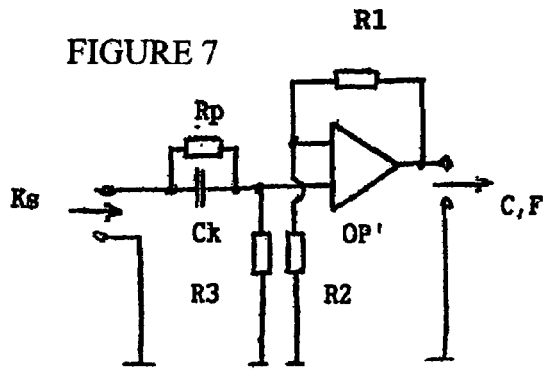
FIGURE 7
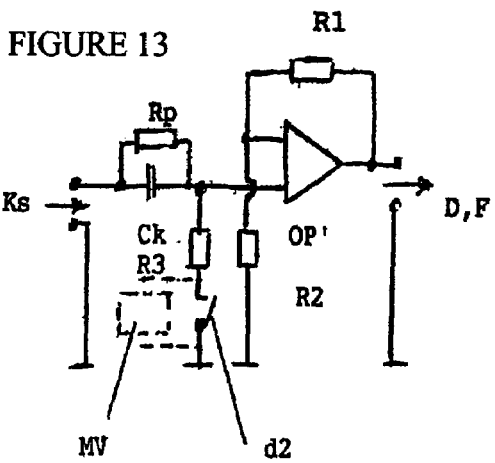
FIGURE 13
FIGURE 11
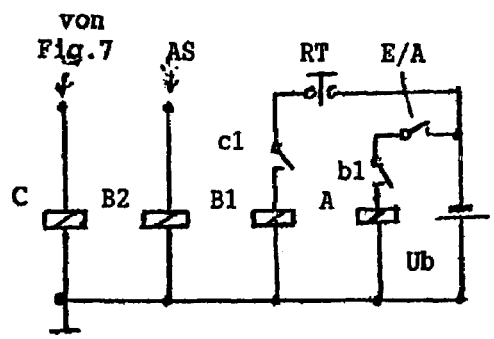
FIGURE 12
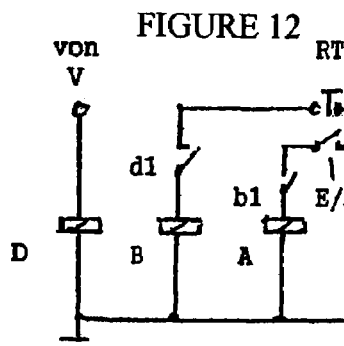
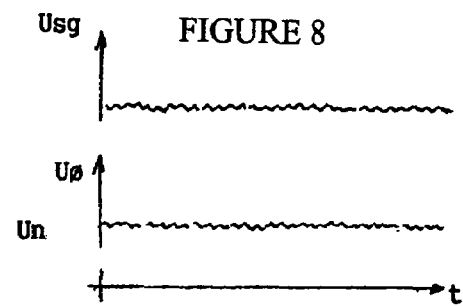
FIGURE 14
FIGURE 8
FIGURE 10
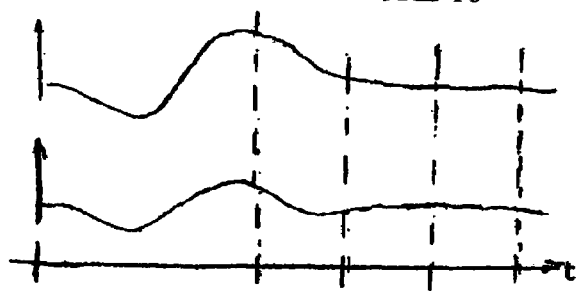
FIGURE 9
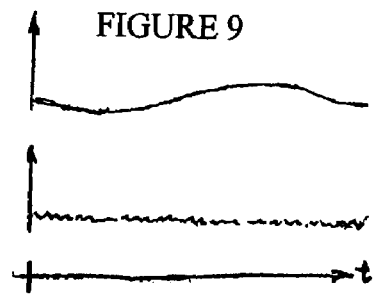

DEVICE FOR DETECTING INTERFERING PIECES IN MATERIAL TO BE CONVEYED

BACKGROUND INFORMATION

The present invention relates to a device for producing a detection signal when interfering pieces appear in an at least largely homogeneous, in particular a non-conductive stream of material to be conveyed, in which an alternating current generator builds up an alternating electromagnetic field via a transmitting coil in a segment of the stream of material to be monitored, whose changes in amplitude and phase are detected by a coil system, that feeds an evaluating circuit, for deriving the detection signal. Such devices are described in, for example, German Patent Nos. 43 42 826, 195 21 266, and the literature described therein.

These types of devices are needed, for example, to detect metal pieces in a stream of material to be conveyed made up of only paper or recyclable plastic which is being fed to a fragmenting apparatus (shredder) for reprocessing. If the material to be conveyed contains solid metal pieces, this can result in significant disruptions in the work flow, if not in fact in destruction of machine parts, even if the pieces are only small. Depending on its intended use, the conveyor apparatus may be designed for example as a conveyor belt, a vibrating conveyor or the like. The detection signal emitted by the device is used to actuate protective equipment, such as optical and/or acoustical signaling means, and shut-off devices to stop the conveyor system, so that the interfering piece may be removed. Using a resetting device, frequently also referred to as a reset button, the entire system can be put in operation again following a detection signal and the corresponding conveyor stoppage. However, it may occur that after transport is halted, an interfering piece of metal is removed from the material to be conveyed, but another metal piece is still present in this segment of the material to be conveyed and is overlooked. When the reset button is actuated, the conveyor stream starts up again, and the additional metal piece reaches downline machines that need to be protected from interfering portions such as metal pieces.

SUMMARY

An object of the present invention is to address the above-described difficulties.

In accordance with an example embodiment of the present invention, this may be accomplished by providing a blocking device for the resetting device controlled by the evaluating circuit, which disables the resetting device as long as the evaluating circuit is still emitting a signal that may be categorized as a detection signal.

BRIEF DESCRIPTION OF THE DRAWINGS

The present invention is described below on the basis of advantageous exemplary embodiments and drawings.

FIG. 7 shows the circuit schematic of an amplifier, such as may also be used in a refinement of a detection device according to an example embodiment of the present invention.

FIGS. 8, 9, 10 show measurement results of curves of the amplitude signal Usg and of the phase signal Uø for various operating states of a single detection device for various material portions to be conveyed.

FIG. 11 shows the circuit schematic of a first example embodiment of the present invention, using an amplifier as shown in FIG. 7.

FIG. 12 shows the circuit schematic of a second example embodiment of the present invention, using a modification of the amplifier as shown in FIG. 7.

FIGS. 13, 14 show an example design of the amplifier for a circuit as shown in FIG. 12, together with a switching program.

DETAILED DESCRIPTION OF EXAMPLE EMBODIMENTS

For better understanding of the present invention, the principle of such devices for detection of interfering material portions to be conveyed will first be explained.

Figure 1:
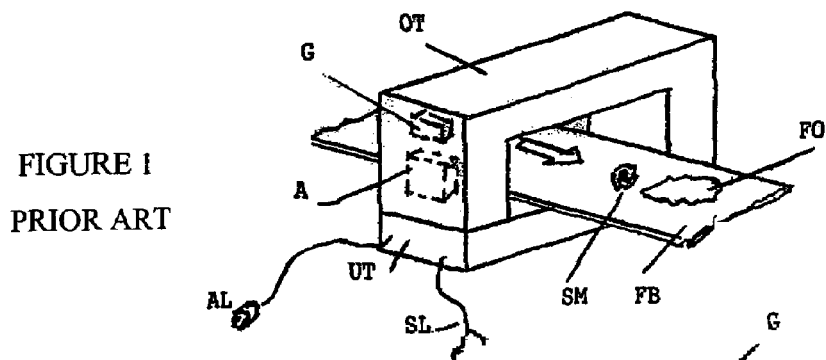
FIG. 1 shows a view of a detection device which encircles a conveyor belt for recognizing metal, but which is also usable for other materials.
Figure 2:
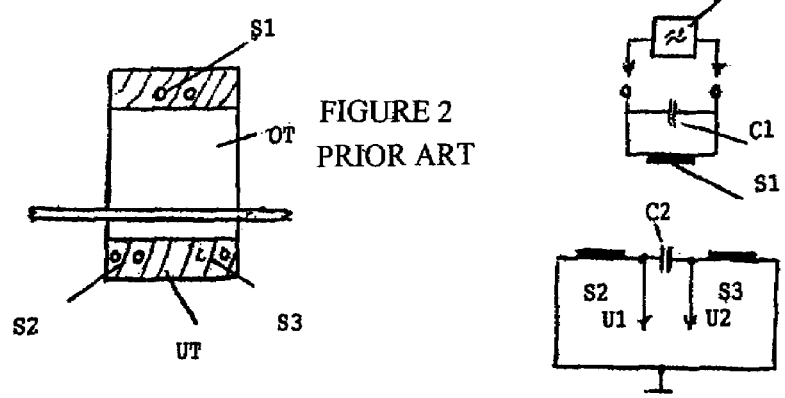
FIG. 2 shows a sectional view through a detection device as shown in FIG. 1.

The device shown in schematic form in FIGS. 1 and 2 is made up, for example, of two parts OT and UT, one of which is designed in U shape and the other as a flat support. The two parts encircle a conveyor belt FB, which transports the material that is to be checked for unwanted metal pieces SM, FO through the device in the direction of the sketched arrow. A transmitting coil S1 is located in part OT. Also contained in part OT are a generator G, which supplies the transmitting coil with alternating current, and a circuit A for deriving a detection signal of conductive metal pieces contained in the material to be conveyed. Two receiving coils S2 and S3, staggered in the direction of transport, are located in support UT, as shown in FIG. 2. The design and arrangement of the coils, as well as the form of the enclosure and the form and nature of the passage opening, are matched to the application in a conventional manner. Their connections are connected to circuit A in part OT via contacts (details of which are not shown). A connecting line AL serves to connect the device to the operating power supply. An output line SL serves to forward a detection signal, derived in A, to one of the protective devices (not shown) mentioned in the preamble.

Figure 3:
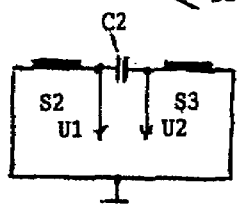
FIG. 3 shows a circuit diagram, having the transmitting coil for generating an alternating electromagnetic field, and a coil system including two coils for reception thereof.

It can be seen from the circuit shown in FIG. 3 that transmission coil S1 is completed into an electrical oscillating circuit by capacitor C1 and that the pair of coils S2, S3 are completed into an electrical oscillating circuit by a capacitor C2. The two oscillating circuits S1, C1 and S2, S3, C2 are synchronized so that they form a band filter tuned to the frequency of the alternating current fed from generator G. The subdivision of the coil and hence of the inductivity in oscillating circuit S2, S3, C2 makes it possible to tap off two signals U1 and U2 that are in phase opposition to the reference potential BP, and to feed them to evaluating circuit A as received signal Ue.

Figure 4:
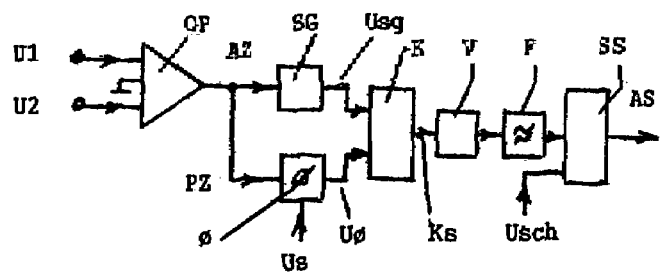
FIG. 4 shows the circuit diagram of a circuit for deriving a detection signal.

As FIG. 4 shows, evaluating circuit A begins with a differential amplifier OP constructed as an operational amplifier, at whose output a split is made into an amplitude branch AZ and a phase branch PZ. In amplitude branch AZ, the peak value of signal Ue is determined by a rectifier stage SG. In phase branch PZ, a phase discriminator ø is inserted, to which signal Us from Generator G is fed as a phase reference signal. Output voltage Uø from ø, as well as output voltage Usg from SG, is in practice a quasi-DC voltage that changes only its value, of which that from ø characterizes a changeable phase angle compared to that from SG. Both output voltages are fed to a comparator K or a compensation stage having adjustable weighting, and are added vectorially. If the conveyor stream is free of interfering portions such as metal pieces, then the two signals are in phase opposition, and may be made to cancel each other out in the output from K by an amplitude regulator inserted into one of the two branches. If a piece of interfering metal, for example, is present in the conveyor stream, then this equilibrium is disturbed, and a signal that is utilizable as a detection signal occurs in the output from K.

Figure 5:
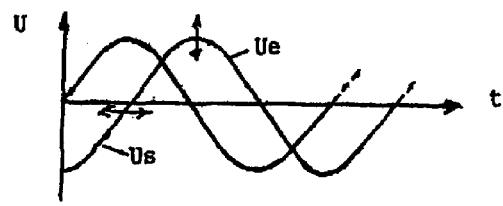
FIG. 5 shows a diagram for clarifying the effect of conductive pieces in the stream of material to be conveyed on the signal picked up via the coil system.

FIG. 5 shows the effect of the passage of a metallic conductive piece that is moved past coil S2 by the conveyor belt. As indicated by the sketched arrows, the eddy currents caused in the piece by the alternating field of coil 1 change both the amplitude and the phase of signal Ue, received through S2 and S3, which is phase-shifted from Us by 90° without such field disturbances. Amplitude signal Usg is evaluated via signal path AZ and phase signal Uø is evaluated via signal path PZ in the aforementioned manner. The portions of DC current superimposed on the two signals are omitted from FIG. 5, as well as from FIGS. 6, 8, 9 and 10 explained later, for reasons of clarity.

The output voltage from K is fed, usually after intermediate amplification in an amplifier V, through a filter F into a threshold circuit SS, at whose output the detection signal AS for an interfering piece, above all a metallic conductive piece, may be extracted. V and F together form a bandpass amplifier, due to the design of the input circuit of amplifier V as a high-pass filter with a very low cutoff frequency and of filter F as a low-pass filter with a comparatively higher cutoff frequency. This bandpass amplifier has the function of suppressing the DC portion in the output from K. The lower cutoff frequency of the bandpass amplifier is generally chosen very low, for example at 0.1 Hz. The upper cutoff frequency is chosen high enough so that the signal changes caused by an interfering portion of the material to be conveyed will still be transmitted reliably. It is based on the time that an interfering portion of the material to be conveyed takes to pass through the detection zone of the coil system, and usually is between 5 Hz and about 500 Hz, depending on the conveyor speed.

A conventional circuit for amplifier V is illustrated in FIG. 7. It contains an operational amplifier OPT, to which output signal Ks from K is fed via a coupling capacitor Ck which determines the lower cutoff frequency. The parallel resistor which indicates the insulating value of the latter is labeled Rp. In the signal input of operational amplifier OP' there is a shunt resistor R3 which contributes to determining the lower cutoff frequency, and to a certain extent also the operating point of the operational amplifier. The second input of operational amplifier OP' is connected with the output via a voltage divider made up of two resistors R1 and R2, and, in addition to setting the operating point, also produces the usual negative feedback for adjusting the gain of the overall circuit.

Figure 6:
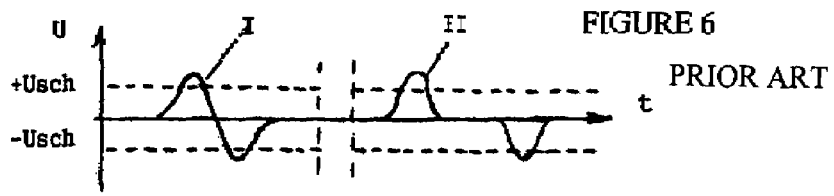
FIG. 6 shows the variation over time of the signal that arises when a metallic conductive piece passes through, at the input to a threshold circuit that serves to emit the detection signal.

A characteristic signal curve in the input of V or SS for the transport of a metallic conductive piece by a device according to FIGS. 1 through 4 is shown by FIG. 6. If the piece is short compared to the spacing between coils S2 and S3, a signal occurs as it passes each of the coils, as designated by I in FIG. 6. If the piece is instead long in comparison, the curve of AS is approximately as indicated by II. FIG. 6 also shows the effect of reference voltage Usch in threshold circuit SS. Only when the threshold values are exceeded does an output signal AS occur, which functions as a detection signal. Such threshold circuits are conventional. The threshold circuit also effectively suppresses any influence of the background noise, which is caused primarily by the thermal noise of the circuit components and the irregularities of the transportation means, passing the coil system, for example a conveyor belt and the material to be transported that contains no interfering portions.

As discussed above, when such systems are in operation, there are always signals present at the output of SG in amplitude branch AZ and in the output of ø in phase branch PZ, independently of whether the conveyor belt and hence the material to be conveyed is in motion. For both signals, this is based on the fact that transmission signal Us is continuously emitted and is continuously received by the receiving coils. Received signals Ue undergo characteristic changes due to interfering portions in the material to be conveyed, from which a shut-off signal may be derived. The variation over time of these signal changes is shaped in a material-specific way by the material to be conveyed which is carried through the coil system on the conveyor system, such as a conveyor belt.

The output signal from OP' is used as an input signal for filter F, to which threshold circuit SS is connected, to which a reference voltage Usch having adjustable value is fed for evaluation or classification of changes in signals at the output of F; if that value is exceeded, the detection signal AS occurs at the output of SS (see FIG. 6). FIGS. 8, 9 and 10 schematically show signal curves, corresponding to FIGS. 5 and 6, measured for certain cases. In each of the three figures, the upper curve Usg is assigned to the output from SG and the lower curve Uø to the output from ø. FIG. 8 relates to the case where a conveyor belt free of material to be conveyed is standing still. The two signals (Usg and Uø) are practically constant, if one ignores the superimposed noise signal caused by the equipment. FIG. 9 relates to the case of a running conveyor belt without material to be conveyed. Signal Usg occurring at the output of SG exhibits a slight fluctuation of amplitude caused by the conveyor belt. Signal Uø occurring in the output of ø is practically unchanged compared to the case in FIG. 8. Similar slight fluctuations also occur when there is material to be conveyed without interfering materials on the conveyor belt. Such signal portions are frequently also designated collectively as product noise. FIG. 10 corresponds to the case where there is a small iron ball having a diameter of 1.2 mm present in neutral material to be conveyed. Pronounced changes are evident in both amplitude signal Usg and phase signal Uø. If there were a small brass ball with a diameter of 2.0 mm present in inherently neutral material to be conveyed, strong changes would be evident in amplitude signal Usg and only smaller changes in phase signal Uø. If there were a small ball of stainless steel with a diameter of 2.5 mm in the neutral material to be conveyed, pronounced changes would be evident in practice only in phase signal Uø. Non-metallic materials such as sugar, salt and substances containing proteins also produce obligatory characteristic signals, when they are present as interfering substances in material to be conveyed of a different substance.

FIG. 11 represents a first design of the circuit for blocking the aforementioned reset button. This circuit is based on the basic circuit in FIG. 4. A drive motor M, not shown in greater detail in FIGS. 1 and 4, for conveyor belt B is connected to an operating power supply Un through a normally open contact a1 of a relay A. Relay A is connected to operating power source Ub through the on/off switch E/A and a contact b1, initially closed, of a bi-stable relay B having the two load windings B1 and B2. Load winding B1 is connected to operating power source Ub through a normally closed contact c1 of a relay C and a reset button R1. Load winding B2 is fed signal AS—when it occurs—from SS. The load winding of relay C is fed by amplifier V or its operational amplifier OP', and thus indirectly with output signal Ks from K—when Ks occurs.

Before the system is started up, contact b1 of the relay having load windings B1 and B2 is closed and contact a1 of relay A is open. By closing on/off switch E/A, relay A is therefore actuated and closes its contact a1. Drive motor M of conveyor B is supplied with its operating current and starts up. Relay A thus acts as a contactor for drive motor M.

If an interfering material portion to be conveyed is detected in the material to be conveyed during transport of the material to be conveyed, evaluation or detection signal AS appears at the output of SS, and is fed to load winding B2. The relay having load windings B1 and B2 is actuated thereby, and its contact b1 goes from the rest position, in which it is closed, to the working position, in which it is open. That stops the power supply to relay A, contact a1 opens and brings drive motor M to a stop.

Because of the bi-stable behavior of relay B, its contact b1 remains in the open state, even when detection signal AS goes back to zero after a short time because of the stopped conveyor belt. In order to be able to return the circuit to its initial state, reset button RT may be used to feed a brief pulse of current to load winding B1 of bi-stable relay B, which restores contact b1 to the original rest position in which bi is closed.

While the conveyor belt is stopped, the triggering interfering material portion, for example a piece of metal, may be removed from the material to be conveyed. When this is done, it may however occur that in addition to the removed material portion, there are also other interfering material portions present in the segment of material to be conveyed being subjected to examination. If reset button RT were actuated in such a case, the conveyor belt would start up again and carry these material portions to the endangered parts of the system.

In order to prevent this, signal Ks from the output signal of comparator K is fed not only to the downline AC amplifier (V, F), but also through the latter to the load coil of relay C. If signal Ks occurs, relay C is actuated and opens its contact c1. That causes the electrical circuit of B1, RT and Ub to be broken, and the actuation of relay A remains interrupted even when reset button R1 is operated. Contact a1 may therefore not be closed. The drive motor remains turned off.

Thus, use is made of the basic idea of the overall system, that because of the constant presence of the signals from SG and PV, output signal Ks is present in comparator K right when a material portion to be removed appears, even when the conveyor belt is stopped, while signal AS decays when the conveyor belt is stopped because of AC amplifier V, F—see FIGS. 5 and 6. Signal AS shuts down and signal Ks blocks a restart, as long as any material portion that needs to be removed still remains in the segment of material to be conveyed being examined. Instead of a bi-stable relay having two load coils, a polarized relay may also be used in a known way, as well as an appropriate electronic circuit having semiconductors or the like.

Another design makes use of the fact that it may be sufficient in some cases if the blocking of reset button R1 is only maintained for a sufficiently long period of time.

As mentioned earlier and as provided in the circuit according to FIG. 4, the DC portion of the output signal from K is suppressed in order to reduce unwanted noise signals and for other reasons due to the fact that by interposing AC amplifier (V, F), only the envelope of output signal Ks from K—see FIG. 6—is processed into detection signal AS. That opens up an additional possibility for disabling the reset button for only a limited time. A design for this will be treated schematically below on the basis of FIG. 12.

In this case too, as in FIG. 11, normally open contact a1 of a relay A connected to SS is inserted into the power supply circuit for drive motor M. The remainder of the circuit is also similar in design to that in FIG. 11 in regard to the on/off switch. However, relay B is only a normal relay, with a normally closed contact b1. In a departure from FIG. 11, there is a relay D with two normally closed contacts d1 and d2. Normally closed contact d1 of relay D is wired in series with reset button RT, and in that regard corresponds to contact c1 in FIG. 11. Normally closed contact d2 is used to control the input circuit of amplifier V. This is done, as shown in FIG. 13 as an example, by opening normally closed contact d2 of relay D, which is in series with bleeder resistor R3 of operational amplifier OP'. That makes the time constant of the input circuit of the operational amplifier very large, and AS becomes effective for a period determined by this time constant. Correspondingly, because of the actuation of D, contact d1 remains open, and the reset button is disabled. Only after the significantly delayed decay of AS to a value lower than that designated by Usch (see FIGS. 4 and 6) does relay D release and close its two normally open contacts d1 and d2, which restores the initial state. In the case where all material portions that need to be separated out have been removed, detection signal AS disappears, and the overall circuit again continues to operate normally.

Because of the leakage currents, particularly in the input of operational amplifier OP', it has proven to be expedient to reduce their influence by briefly closing normally closed contact d2 intermittently during the blocking. That causes coupling capacitor Ck to partially discharge at first, but it recharges again to the initial level after d2 opens again. The input of operational amplifier OP' is thereby restored to the initial level. If the material to be conveyed on the stopped conveyor belt still contains an interfering material portion, or a portion that needs to be removed, operational amplifier OP' works as it did before d2 closed, and continues to keep reset button RT disabled through relay D and its contact d1. For a normal coupling capacitor Ck, i.e., one that is not of extremely high impedance, it is sufficient for there to be about 5 minutes when relay D is actuated if d2 is closed for about 1 millisecond approximately every 5 seconds. That can be done for example by using a non-stable multivibrator with the appropriate mark-to-space ratio, which actuates a bypass switch which is interposed in the same way as d2; d2 may then be omitted. This is indicated in FIG. 13 by the component MV, drawn with broken lines. FIG. 14 shows the corresponding switching program.

Thus, from the perspective of the circuit principle, in this way amplifier V is given at least approximately the behavior of a DC amplifier when a detection signal occurs, through a switchover controlled by AS, by dropping its lower cutoff frequency to an extremely low value, and the overall circuit is allowed to return to the initial state by removal of the interfering portion from the material to be conveyed.

In the exemplary embodiments shown in FIGS. 11 through 14, the signals are processed using analog-operative modules. If these signals are converted to digital signals by analog/digital converters before they are processed in the evaluating circuit, the processing may be performed on a digital basis. The corresponding components or modules, such as a comparator, an amplifier, a filter or a threshold circuit, are available commercially as conventional ICs. In the exemplary embodiments, commercially available relays are provided for the individual switching functions. These relays may also be replaced by corresponding, commercially available semiconductor circuits or integrated circuits.

In another example embodiment of the present invention, use is also made of the fact that, when the conveyor belt is stopped, the signal values that are present at that time at the outputs of SG and ø continue to exist in the transmission paths from AZ and PZ until the corresponding, triggering material portion is removed. So if one stores at least one characteristic signal value before an interfering material portion appears and compares it to that which occurs when an interfering material portion appears, that is, with the characteristic signal value that exists when the associated stoppage of the conveyor belt occurs, the result is a non-zero comparison value. If the comparison value differs from zero, the reset button is disabled. This comparison value in practice then again becomes negligibly small or zero when the interfering material portion is taken from the conveyor belt or is removed from the detection zone of the coil system. The reset button is then enabled again. This state thus serves to disable the reset button temporarily. Another example embodiment of the present invention that makes use of this is shown schematically in FIG. 15 in the form of a circuit diagram.

In this circuit, the transmission paths from AZ and PZ to AS correspond to those according to FIG. 4. The signals are continuously captured from the output from SG and ø in the form of amplitude samples, via samplers which are controlled using sampling timing signal ST from a timing or control signal center TZ, and are each fed to a memory—in the exemplary embodiment shift registers SR1 and SR2— which are also controlled by the timing center TZ through an input pulse ET and a clock pulse signal FT.

The sampling rate is determined from the conveyor speed of the transport device, and from the geometric detection zone of the coil system. It should be high enough so that at least one sample value that is characteristic of the transport of material to be conveyed without interfering admixtures has been registered before the conveyor belt stops. The conveyor speed of such equipment is usually slower than 1 meter per second, for example around 0.3 meter per second. With these values, and a detection zone that extends about 0.15 meter beyond the coil system, a sampling interval of from about 10 milliseconds to a few hundred milliseconds (sampling frequency between about 100 Hz and a few Hz) is generally sufficient. Corresponding sampling points are identified in FIG. 10 by dashed lines on the time axis t.

In the exemplary embodiment, shift registers SR1 and SR2 each have several outputs in the shift direction, at which amplitude samples stored one after the other over time are available. The readout of the shift registers is performed using a readout signal Asg, also under the control of timing center TZ, as a continuous signal—while ET and FT are interrupted or halted—when a signal AS appears in the output from SS. This is indicated by a dashed connection. The signal read out from SR1 is compared with the output signal from SG in a subtractor Subtr1, which functions as a comparator. The signal read out from SR2 is compared with the output signal from ø in another subtractor Subtr2, which also functions as a comparator. The output signals from both comparators are fed to a gate circuit, in the present case an OR element, which emits an output signal whenever at least one of the comparator output signals has a value that is based on an interfering material portion in the stationary stream of material to be conveyed.

The illustrated use of subtractors brings the additional advantage that any drift effects that happen to appear in the operational amplifier OP become largely irrelevant for the comparison, since their effects on both the stored values and the values captured directly for the comparison are largely equal and thus cancel each other out.

The output signal from the OR element is used then for storage, and thus to control relay C in FIG. 11 (instead of signal KS) or relay D in FIG. 12 (instead of signal AS). The truth table for the OR circuit in this exemplary embodiment is as follows:

| Output from subtractor 1 | Output from subtractor 2 | Output from OR circuit |
| --- | --- | --- |
| 0 | 0 | 0 |
| 1 | 0 | 1 |
| 1 | 1 | 1 |
| 0 | 1 | 1 |

The gate, i.e., logic circuit thus corresponds to a logic circuit like that shown and explained in FIG. 4 on page 51 of the book "Digitaltechnik" by Beuth, 10th edition, published by Vogel Verlag.

Figure 15:
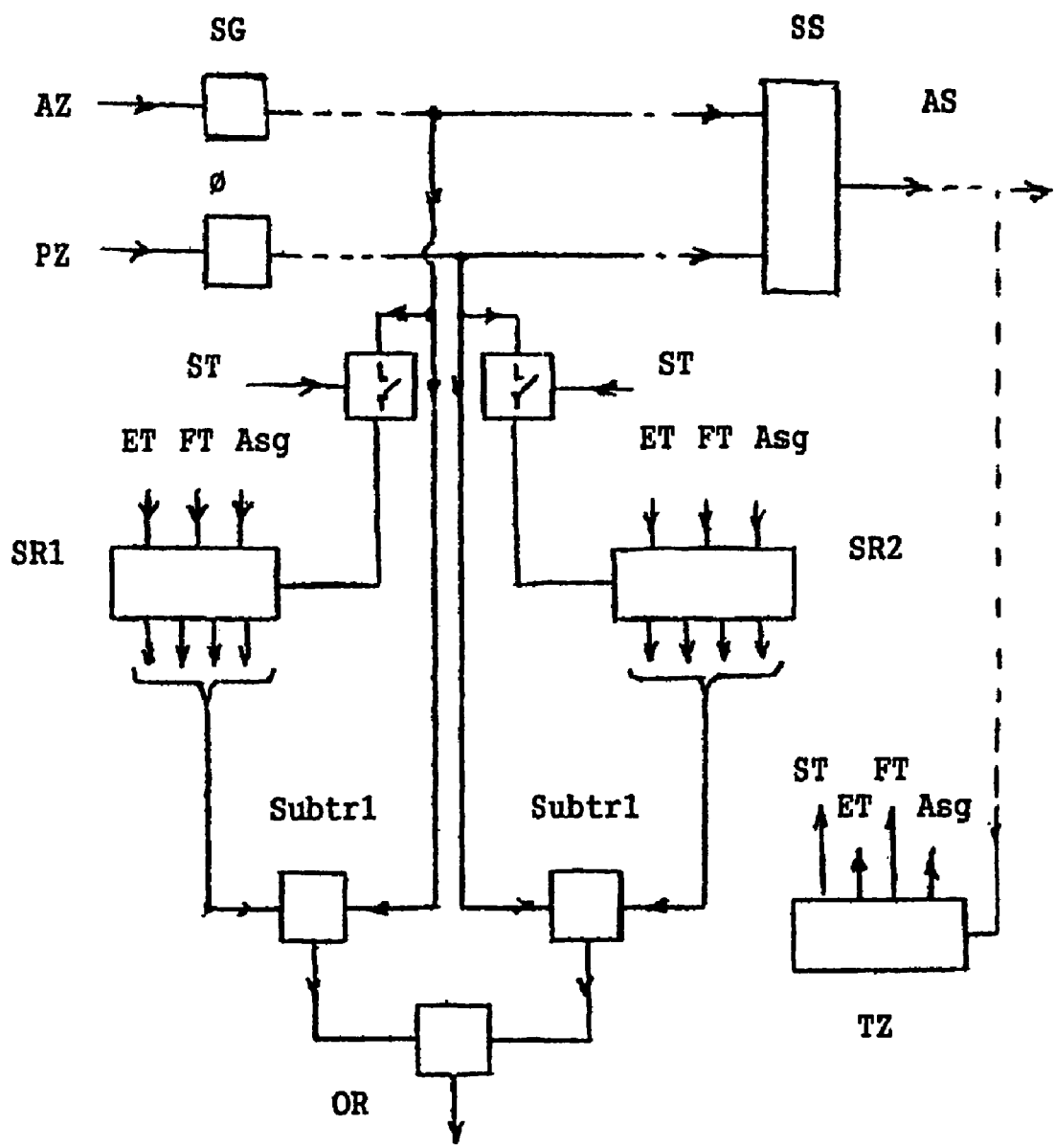
FIG. 15 shows the circuit schematic of a third example embodiment of the present invention.

In the exemplary embodiment shown in FIG. 15, each of the shift registers has several signal outputs. Strictly speaking, it is sufficient for evaluation of the signal if only one previous sample value is used for the comparison with the sample value that appears when the conveyor belt is stopped. But if a plurality of stored values preceding the conveyor belt stoppage are combined and a mean is derived from them for the comparison, then this reduces the effect of variations caused both by the conveyor belt and by the material to be conveyed (FIG. 9). Such averaging is possible for example by adding up the analog output signals from the individual memory and then dividing them to the desired value using a voltage divider. One way to do this is to set the outputs of the particular memory to high impedance, and make an impressed current work on a common working resistor having a resistance that is low compared to the outputs. The sum of the individual currents then determines the value of the voltage drop across the working resistor, which is then divided for further processing by a partial tap of the working resistance according to the number of infeeds.

In the case of digital signal processing, which will be discussed later, calculation of the mean value is even simpler, since in that case the digital values in the memory outputs merely need to be added up digitally, and the resulting digital value correspondingly divided digitally.

Further improvement is achievable using a threshold circuit that suppresses negligibly small signal values. This is primarily of interest when the background noise or product noise in the area of the interfering material portion is somewhat different from the corresponding values stored previously.

A corresponding threshold assessment may also be performed already in the outputs of subtractors Subtr1 and Subtr2. It is possible thereby to largely eliminate the influence of the generally unavoidable but inherently non-interfering irregularities in the product stream.

In the exemplary embodiment shown in FIG. 15 as well, as in the exemplary embodiments according to FIGS. 11 and 12, the entire evaluation is done by analog methods. Memories SR1 and SR2 are then accordingly analog value memories, for example in the form of conventional CCD components or a magnetic recording medium. Digital design is recommended also in this case, however, since the control signals which that requires are available from timing center TZ. In this case too, the signals Usg of the circuit path from AZ and ø of the circuit path from PZ must be converted to corresponding digital signals using interposed A/D converters. Shift registers SR1 and SR2 and comparators (Subtr1, Subtr2) are then normal digital components. For evaluation using a circuit for reset button blocking according to FIG. 15 in the digital version, a 4-bit code (16 amplitude values) or an 8-bit code (256 amplitude values) is generally sufficient, depending on the amplitude resolution required in the individual case. The requisite digital modules corresponding to the analog modules, such as filters, subtractors, comparators, amplifiers, relays, threshold circuit etc., are commercially available conventional ICs, so that a detailed description is superfluous here.

It should further be remarked that in the case of interfering materials to be detected which trigger generally only amplitude changes or only phase changes, in a circuit according to FIG. 15 the unneeded evaluation part may also be switched off or even eliminated if appropriate. With practically exclusively amplitude change, the phase branch segment with SR2, Subtr2 and possibly OR may be eliminated, and with practically exclusively phase change, the amplitude branch with SR1, subtractor 1 and possibly OR may be eliminated.

Furthermore, with all of the exemplary embodiments, including specifically when relays are used, it may be expedient to provide for amplification of the portions of signals that are tapped off for the blocking, especially of signal KS. In the present exemplary embodiments, for the sake of clarity such amplifiers are not shown. There is a relationship in this respect with the absolute values of signal values Usg, Uø and Ks. If these are for example in the range of one volt or more, and if the amplitude changes of these signals in response to interfering material portions are only a few millivolts, these largely cancel each other out in the subtractor except for the change values. For this case, it is therefore recommended that the change values not be amplified until after the subtractor. In the case of digital processing, a relatively high resolution is then appropriate in the digitization.

Figure 16:
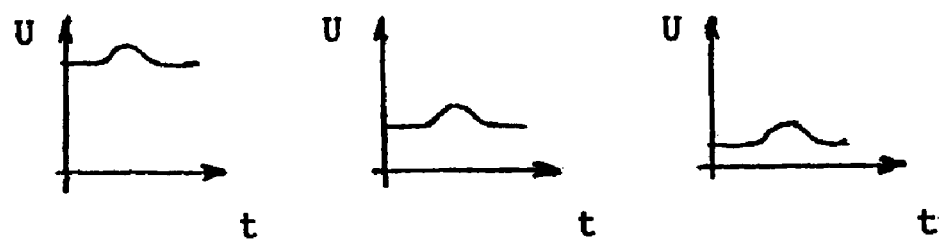
FIG. 16 shows an effect achievable with threshold circuits.

Another way, which is likewise also advantageous in the case of digital signal processing, because it makes lower demands on the resolution in the digitization, is provided by the following circuitry trick. Signals Usg and Uø are routed through a threshold circuit, which allows only signals that exceed a minimum value to pass. This minimum value is preferably chosen so that it is just barely lower than the lowest possible absolute value. In this way, the DC portion present in signals Usg, Uø and Ks is reduced to a value matched to the particular case. This also applies by analogy to signal Ks in the previous examples. Such threshold circuits are shown and described in principle for example on pages 194 through 196 ff. of the book "Theorie und Technik der Pulsmodulation" by Hölzler and Holzwarth, published in 1957 by Springer-Verlag. The effect of the aforementioned threshold circuit is demonstrated in FIG. 16. The left-hand diagram shows the initial state. The absolute value is relatively high due to the relatively high DC voltage component, and the amplitude changes or variations are only a fraction of the absolute value. If the high DC voltage component is reduced by using the aforementioned threshold circuit, the result is a signal like that shown in the middle diagram of FIG. 16. The amplitude changes or variations are significantly elevated compared to the left-hand diagram. Consequently, they are significantly easier to evaluate. If the signal represented in the middle diagram is amplified, and if the amplified signal is fed to another threshold circuit in the aforementioned manner, the amplitude changes or variations are even easier to evaluate, as may be seen from the right-hand diagram.

What is claimed is:

1. A device for producing a detection signal when interfering components occur in an at least largely nonconductive stream of material being conveyed via a conveyor, comprising:
   an alternating current generator configured to build up, through a transmitting coil, an alternating electromagnetic field in a segment of the stream of material;
   a coil system configured to detect changes in amplitude and phase of the alternating electromagnetic field;
   an evaluation circuit coupled to the coil system and configured to derive the detection signal, which, when an interfering component of the material being conveyed appears, causes the conveyor to be stopped for removal of the interfering component from the stream;
   a resetting device capable of canceling the stoppage of the conveyor; and
   a blocking device controlled by the evaluation circuit and provided for the resetting device, the blocking device configured to disable the resetting device as long as the evaluating circuit is still emitting a signal that is classifiable as a detection signal.

2. The device as recited in claim 1, further comprising:
   at least one AC voltage amplifier provided in a transmission path from the coil system to the evaluation circuit, the AC voltage amplifier being designed to be switchable to such a low value in regard to its lower cutoff frequency, that in a switched state, a transmission behavior of the AC voltage amplifier at least approximately approaches that of a DC voltage amplifier, and wherein an output signal of the AC voltage amplifier actuates the blocking device.

3. The device as recited in claim 2, wherein the lower cutoff frequency is lowered briefly and intermittently.

4. The device as recited in claim 1, wherein the blocking by the blocking device disables the resetting device, at least for a period of time needed to remove the interfering component from the stream.

5. The device as recited in claim 1, wherein the evaluation circuit is configured to derive the blocking signal from at least one of the amplitude and the phase, the blocking signal opening a current circuit of the resetting device.

6. The device as recited in claim 1, further comprising:
   a sampling device configured to sample at least one of the phase and the amplitude;
   a memory which continuously stores sampled values from the sampling device;

a comparator;

a memory readout device provided for the memory configured to feed to the comparator, when the conveyor stops, at least one of the values stored before the stoppage of the conveyor and a value of at least one of the phase and the amplitude occurring after the stoppage of the conveyor, the comparator blocking the resetting device when a resulting comparison value exceeds a limiting value.

7. The device as recited in claim 6, wherein the comparator is a subtractor.

8. The device as recited in claim 6, further comprising:

an averaging device assigned to the memory, which forms a mean signal for the comparison from a plurality of the sampled values stored in the memory.

9. The device as recited in claim 1, wherein the blocking device includes a bi-stable relay having two load windings and one normally closed contact, the bi-stable relay being provided in an electric circuit of a contactor relay for driving a motor of the conveyor, a first one of the load windings being provided in an electric circuit of the resetting device, a normally closed contact of another relay fed by a compensation stage of the evaluation circuit also provided in the electric circuit of the resetting device, and wherein the blocking signal is fed to the second one of the load windings.

10. The device as recited in claim 1, wherein the blocking device includes a contact relay having a first load winding and a normally closed contact, the contact relay being provided in an electric circuit for feeding a drive motor of the conveyor, the blocking device further including a second relay having a normally closed contact and a load winding which is inserted into an electric circuit of the first load winding, the normally closed contact of the second relay being provided in an electric circuit of the resetting device via a normally closed contact of a third relay having a load winding, wherein the blocking signal that occurs when an interfering component appears switches the normally closed contact in the resetting device to an open state.

11. The device as recited in claim 1, wherein the blocking device includes at least one threshold circuit that reduces a DC voltage component compared to the changes.

* * * * *